United States Patent
Xu

(10) Patent No.: US 9,246,381 B2
(45) Date of Patent: Jan. 26, 2016

(54) ACTIVE POWER FACTOR CORRECTION CONTROL CIRCUIT, CHIP AND LED DRIVING CIRCUIT THEREOF

(71) Applicant: Silergy Semiconductor Technology (Hangzhou) LTD, Hangzhou, ZheJiang Province (CN)

(72) Inventor: Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/568,009

(22) Filed: Dec. 11, 2014

(65) Prior Publication Data

US 2015/0171742 A1 Jun. 18, 2015

(30) Foreign Application Priority Data

Dec. 18, 2013 (CN) .......................... 2013 1 0701205

(51) Int. Cl.
| | |
|---|---|
| H05B 41/16 | (2006.01) |
| H02M 1/42 | (2007.01) |
| H02M 1/08 | (2006.01) |
| H05B 33/08 | (2006.01) |

(52) U.S. Cl.
CPC .............. *H02M 1/4241* (2013.01); *H02M 1/08* (2013.01); *H05B 33/0815* (2013.01)

(58) Field of Classification Search
USPC ............................... 315/209 R, 247, 291, 308
See application file for complete search history.

(56) References Cited

U.S. PATENT DOCUMENTS

| | | | |
|---|---|---|---|
| 8,687,382 B2 | 4/2014 | Chen | |
| 8,736,236 B2 | 5/2014 | Sun et al. | |
| 8,853,958 B2 * | 10/2014 | Athalye | H05B 33/0815 315/194 |
| 9,124,170 B2 * | 9/2015 | Gu | H02M 1/4225 |
| 2010/0097041 A1 | 4/2010 | Ayukawa et al. | |
| 2010/0246226 A1 * | 9/2010 | Ku | H02M 1/4225 363/126 |
| 2013/0223119 A1 | 8/2013 | Zhao et al. | |

FOREIGN PATENT DOCUMENTS

CN 101707837 A 5/2010

* cited by examiner

*Primary Examiner* — Thuy Vinh Tran
(74) *Attorney, Agent, or Firm* — Michael C. Stephens, Jr.

(57) ABSTRACT

In one embodiment, an active power factor correction (APFC) control circuit, configured to generate a pulse-width modulation (PWM) control signal to control the operation of a power converter, can include: (i) an inductor current zero crossing detection circuit coupled to a common node between a power switch of the power converter and a first switch that are coupled in series, where the inductor current zero crossing detection circuit is configured to generate a comparison signal based on a voltage signal at the common node; (ii) the comparison signal being activated when an inductor current of the power converter decreases to zero; and (iii) the APFC control circuit being configured as a source driver, wherein a control terminal of the power switch is coupled to a constant voltage supply.

19 Claims, 6 Drawing Sheets

US 9,246,381 B2

ACTIVE POWER FACTOR CORRECTION CONTROL CIRCUIT, CHIP AND LED DRIVING CIRCUIT THEREOF

RELATED APPLICATIONS

This application claims the benefit of Chinese Patent Application No. 201310701205.8, filed on Dec. 18, 2013, which is incorporated herein by reference in its entirety.

FIELD OF THE INVENTION

The present invention relates to electronics, and more specifically to active power factor correction control circuits, and an LED driving circuit.

BACKGROUND

Switch mode power supplies can efficiently convert electrical power from a the source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight. Switch mode power supplies can be used in many applications, such as LED driver circuits.

SUMMARY

In one embodiment, an active power factor correction (APFC) control circuit, configured to generate a pulse-width modulation (PWM) control signal to control the operation of a power converter, can include: (i) an inductor current zero crossing detection circuit coupled to a common node between a power switch of the power converter and a first switch that are coupled in series, where the inductor current zero crossing detection circuit is configured to generate a comparison signal based on a voltage signal at the common node; (ii) the comparison signal being activated when an inductor current of the power converter decreases to zero; and (iii) the APFC control circuit being configured as a source driver, wherein a control terminal of the power switch is coupled to a constant voltage supply.

DETAILED DESCRIPTION

Figure 1:
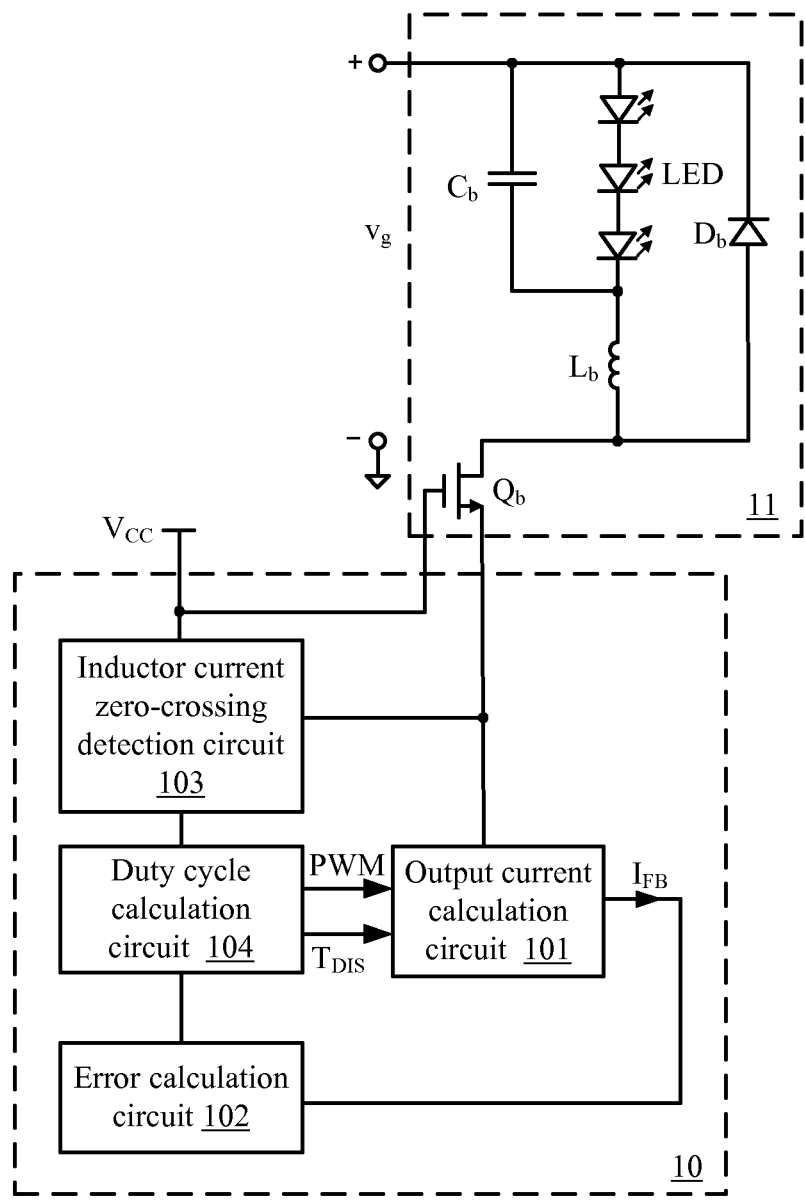
FIG. 1 is a schematic block diagram of a first example APFC control circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

As compared with traditional incandescent lamps and fluorescent lamps, light-emitting diode (LED) has advantages of longer life and "green" non-pollution, lending itself to a wide range of potential applications. Lighting products employing LED must meet harmonic wave standard requirements. Therefore, the power factor of an LED driving circuit should be high, and this can be achieved by a power factor correction (PFC) method. PFC approaches can include passive power factor correction (PPFC) and active power factor correction (APFC).

An LED driving circuit employing APFC can include a power converter coupled to an LED load and an APFC control circuit. An AC input voltage may be rectified and filtered to generate a DC input voltage. The power converter can generate the required driving voltage and driving current to drive the LED load. Also, the on and off states of a power switch of the power converter can be controlled by a pulse-width modulation (PWM) control signal generated by the APFC control circuit, in order to improve the power factor of the LED driving circuit. When an APFC control circuit is employed to achieve a higher power factor, the structure of the APFC control circuit can be simplified and integrated into a single chip or integrated circuit (IC). However, the output current of the power converter may not be well-regulated in some cases, and peripheral circuits of the chip may be relatively complicated, which can increase difficulty of circuit debug.

An APFC control circuit can include an output current calculation circuit, an error calculation circuit, an inductor current zero crossing detection circuit, and a duty cycle calculation circuit. A constant voltage may be provided to the gate of the power switch of the power converter, and the periodic on and off states of the power switch can be controlled by changing the gate—the source voltage of the power switch, which can be achieved by regulating the voltage of the source of the power switch. In this way, the driving circuit of particular embodiments can simplify debugging of the APFC control circuit. Also, when the APFC control circuit is integrated into one chip, the number of pins of the chip can be relatively low (e.g., four), in order to decrease the amount and complication of peripheral circuitry, which can also simplify circuit debug.

In one embodiment, an active power factor correction (APFC) control circuit, configured to generate a pulse-width modulation (PWM) control signal to control the operation of a power converter, can include: (i) an inductor current zero crossing detection circuit coupled to a common node between a power switch of the power converter and a first switch that are coupled in series, where the inductor current zero crossing detection circuit is configured to generate a comparison signal based on a voltage signal at the common node; (ii) the comparison signal being activated when an inductor current of the power converter decreases to zero; and (iii) the APFC control circuit being configured as a source driver, wherein a control terminal of the power switch is coupled to a constant voltage supply.

Referring now to FIG. 1, shown is a schematic block diagram of a first example APFC control circuit, in accordance with embodiments of the present invention. This particular example includes an APFC control circuit employed to drive power converter 11 to improve the power factor. APFC control circuit 10 can include output current calculation circuit 101, error calculation circuit 102, inductor current zero crossing detection circuit 103, and duty cycle calculation circuit 104.

A first input terminal of output current calculation circuit 101 can connect to a first output terminal of duty cycle calculation circuit 104, a second input terminal can connect to a second output terminal of duty cycle calculation circuit 104, a third input terminal can connect to the source of power switch $Q_b$ of power converter 11, and an output terminal can connect to an input terminal of error calculation circuit 102. An output terminal of error calculation circuit 102 can connect to a first input terminal of duty cycle calculation circuit 104. A first input terminal of inductor current zero crossing detection circuit 103 can connect to both DC voltage supply $V_{CC}$ and the gate of power switch $Q_b$, a second input terminal can connect to the source of power switch Qb, and an output terminal can connect to a second input terminal of duty cycle calculation circuit 104.

A peak value of the current flowing through inductor $L_b$ may be sampled by output current calculation circuit 101, in order to generate current feedback signal $I_{FB}$. Error calculation circuit 102 can generate a compensation signal in accordance with a voltage feedback signal that represents current feedback signal $I_{FB}$, and a trigger signal output by duty cycle calculation circuit 104. Inductor current zero crossing detection circuit 103 can detect the current flowing through inductor $L_b$, and may activate a comparison signal when the current flowing through inductor $L_b$ decreases to zero. Duty cycle calculation circuit 104 can generate a PWM control signal and trigger signal $T_{DIS}$. The PWM control signal can be provided to output current calculation circuit 101 to control the on and off states of power switch $Q_b$. Trigger signal $T_{DIS}$ can be used by output current calculation circuit 101 to generate current feedback signal $I_{FB}$.

In this example, the gate of power switch $Q_b$ can connect to DC voltage supply $V_{CC}$, and the voltage of the gate can be maintained as substantially constant. The source of power switch $Q_b$ can connect to a third input terminal of output current calculation circuit 101. The source voltage of power switch $Q_b$ may vary along with the voltage at the third input terminal of output current calculation circuit 101, such that the gate—the source voltage changes, and correspondingly controls power switch $Q_b$ to be on or off. In this example, power switch $Q_b$ may be driven by a source driver of APFC control circuit 10. In this way, APFC control circuit 10 and the circuit debug may be more simplified, as compared to other approaches.

Power converter 11 can include power switch $Q_b$, inductor $L_b$, capacitor $C_b$ and diode $D_b$. For example, capacitor $C_b$ and the LED load can connect in parallel, and then to inductor $L_b$ in series to form a branch circuit. Also diode $D_b$ can connect in parallel with the branch circuit. Input voltage $V_g$ can provide DC voltage to the branch circuit, and may be converted (e.g., increased or decreased) to an output voltage by controlling the on and off states of power switch $Q_b$.

Figure 2:
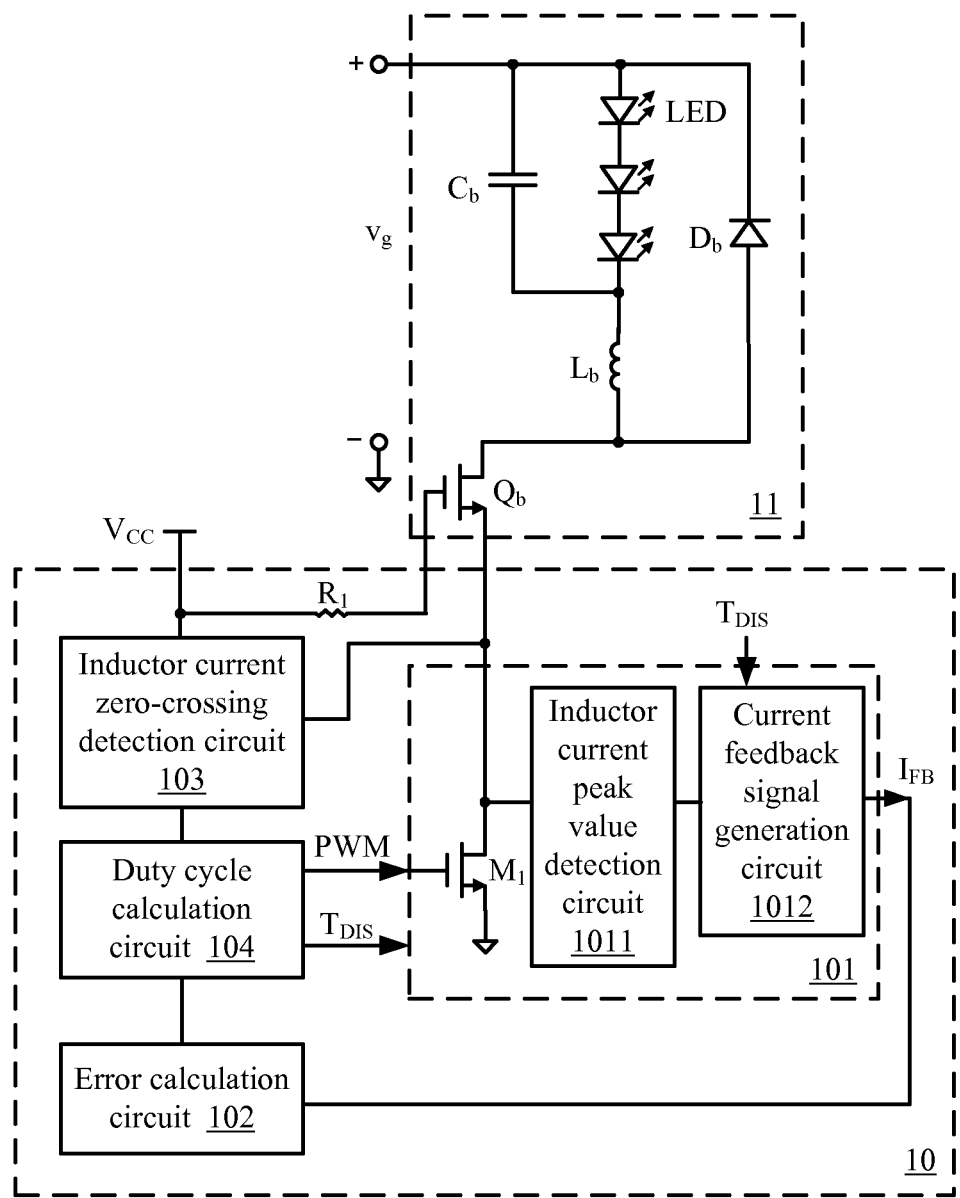
FIG. 2 is a schematic block diagram of a second example APFC control circuit, in accordance with embodiments of the present invention.

Referring now to FIG. 2, shown is a schematic block diagram of a second example APFC control circuit, in accordance with embodiments of the present invention. In this example, APFC control circuit 10 can include output current calculation circuit 101, which includes switch $M_1$, inductor current peak value detection circuit 1011, and current feedback signal generation circuit 1012. The gate of switch $M_1$ can be configured as the first input terminal of output current calculation circuit 101, and can connect to the first output terminal of duty cycle calculation circuit 104, the drain may be configured as the third input terminal of output current calculation circuit 101, and can connect to the source of power switch $Q_b$ of the power converter 11, and the source can connect to ground. An input terminal of inductor current peak value detection circuit 1011 can connect to the drain of switch $M_1$, an output terminal of which can connect to an input terminal of current feedback signal generation circuit 1012. An output terminal of current feedback signal generation circuit 1012 may be configured as the output terminal of output current calculation circuit 101 and can connect to the input terminal of error calculation circuit 102.

When power switch $Q_b$ and switch $M_1$ are both on, current flowing through power switch $Q_b$ and switch $M_1$ may be consistent with the inductor current flowing through inductor $L_b$. Inductor current peak value detection circuit 1011 can connect to the source of power switch $Q_b$, in order to sample the inductor current. When the inductor current reaches a level of a peak value, the peak value of the inductor current can be provided to current feedback signal generation circuit 1012. Current feedback signal generation circuit 1012 can generate current feedback signal $I_{FB}$ in accordance with trigger signal $T_{DIS}$ and a signal representing the peak value of the inductor current.

In this example, PWM control signal may be generated by duty cycle calculation circuit 104 to control the on and off states of switch $M_1$, in order to control the source voltage of power switch $Q_b$. Therefore, power switch $Q_b$ may be controlled to be on and off periodically. Switch $M_1$ can be an N-type MOSFET transistor or a P-type MOSFET transistor, or other suitable transistors. In this example, resistor $R_1$ can connect between the gate of power switch $Q_b$ and DC voltage supply $V_{CC}$. One terminal of resistor $R_1$ can connect to the gate of power switch $Q_b$, and the other terminal can connect to DC voltage supply $V_{CC}$ to better supply a constant bias voltage to the gate of power switch $Q_b$.

Figure 3:
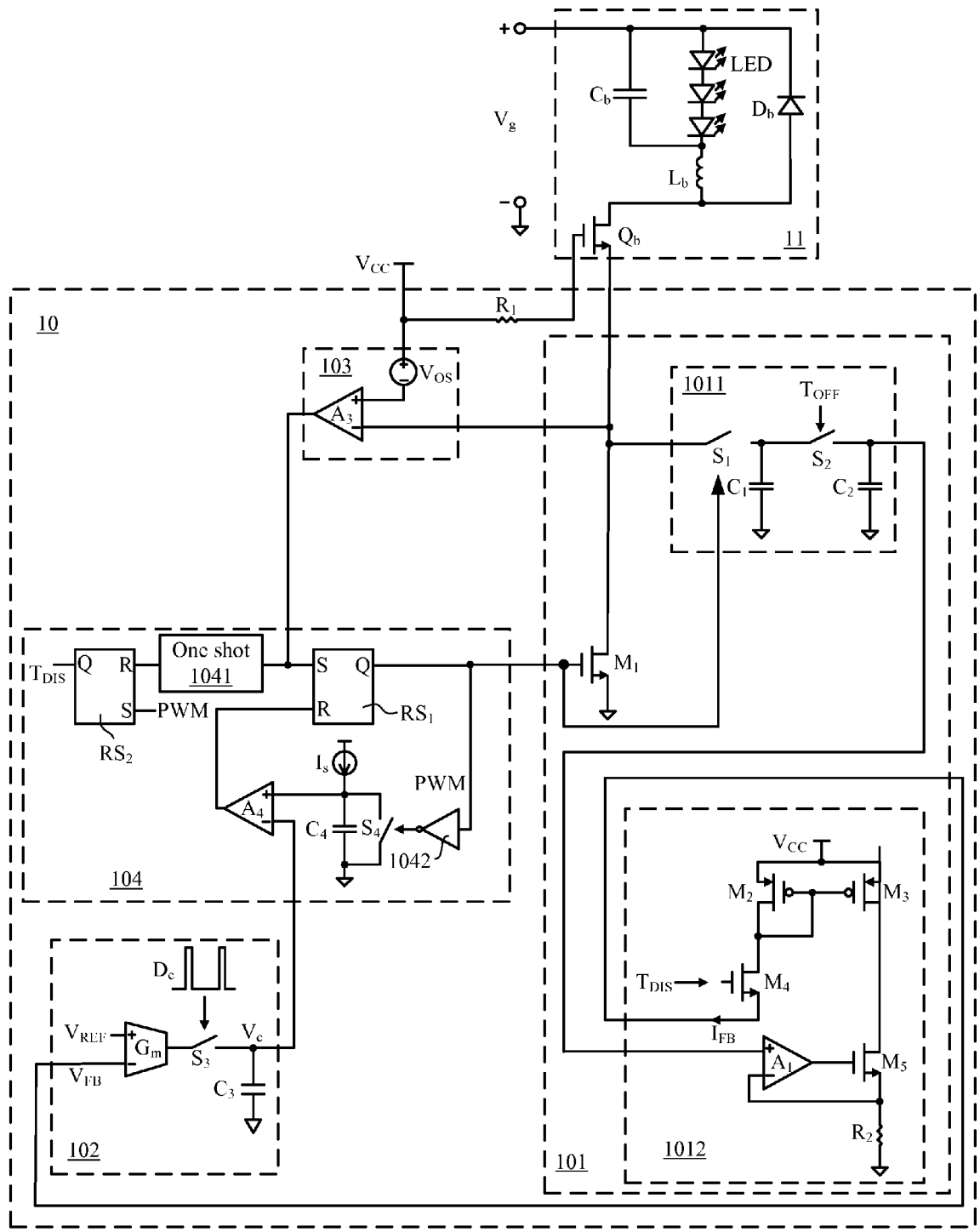
FIG. 3 is a schematic block diagram of a third example APFC control circuit, in accordance with embodiments of the present invention.

Referring now to FIG. 3, shown is a schematic block diagram of a third example APFC control circuit, in accordance with embodiments of the present invention. Inductor current peak value detection circuit 1011 of output current calculation circuit 101 can include controllable switch $S_1$, controllable switch $S_2$, capacitor $C_1$, and capacitor $C_2$. A first terminal of controllable switch $S_1$ can be configured as the input terminal of inductor current peak value detection circuit 1011, and can connect to the drain of switch $M_1$, and a second terminal can connect to a first terminal of capacitor $C_1$. A second terminal of capacitor $C_1$ can connect to ground. A first terminal of controllable switch $S_2$ can connect to the first terminal of capacitor $C_1$, and a second terminal can connect to a first terminal of capacitor $C_2$, which can be configured as the input terminal of inductor current peak value detection circuit 1011, and a second terminal of capacitor $C_2$ can connect to ground.

Switch $S_1$ can be controlled by a PWM control signal, and switch $S_2$ can be controlled by a complementary version of the PWM control signal. For example, when power switch $Q_b$ is on, controllable switch $S_1$ is on, and when power switch $Q_b$ is off, controllable switch $S_2$ is on. When the PWM control signal is high, current flowing through switch $M_1$ can be consistent with the current flowing through inductor $L_b$, and controllable switch $S_1$ may be on. Therefore, capacitor $C_1$ can be charged by the current flowing through switch $M_1$. The voltage across capacitor $C_1$ can represent the peak value of the inductor current at the end of the on time of controllable switch $S_1$. When PWM control signal goes low, controllable switch $S_1$ may be turned off, and controllable switch $S_2$ can be turned on, and the voltage across capacitor $C_2$ may be consistent with (e.g., substantially the same as) the voltage across capacitor $C_1$. Therefore, the voltage across capacitor $C_2$ that represents the peak value of the inductor current can be provided to current feedback signal generation circuit 1012.

Current feedback signal generation circuit 1012 can include switch $M_2$, switch $M_3$, switch $M_4$, switch $M_5$, amplifier $A_1$, and resistor $R_2$. The gates of switches $M_2$ and $M_3$ can be connected together, and the sources of switches $M_2$ and $M_3$ can connect to DC voltage supply $V_{CC}$. The gate of switch $M_2$ can connect to its drain. The drain of switch $M_2$ can connect to the drain of switch $M_4$, and the drain of switch $M_3$ can connect to the drain of switch $M_5$. The gate of switch $M_4$ may be configured as the second input terminal of output current calculation circuit 101, and can connect to the second output terminal of duty cycle calculation circuit 104, and the source can be configured as the output terminal of output current calculation circuit 101, and can connect to the input terminal of error calculation circuit 102. The gate of switch $M_5$ can connect to an output terminal of amplifier $A_1$, and the source can connect to an inverting input terminal of amplifier $A_1$ and to a first terminal of resistor $R_2$. A non-inverting input terminal of amplifier $A_1$ can be configured as the input terminal of current feedback signal generation circuit 1012, and can connect to a first terminal of capacitor $C_2$. A second terminal of resistor $R_2$ can connect to ground.

Amplifier $A_1$ can receive a voltage signal across capacitor $C_2$ that represents the peak value of inductor current. In accordance with the "virtual short" principle of an amplifier, the current flowing through resistor $R_2$, switch $M_5$, and switch $M_3$ may be the ratio between the value of the voltage signal and resistor $R_2$. In view that switches $M_2$ and $M_3$ may form a current mirror, the current flowing through switches $M_2$ and $M_4$ can be in direct proportion with the current flowing switch $M_3$. When switch $M_4$ is controlled to be on by trigger signal $T_{DIS}$, current feedback signal $I_{FB}$ can be generated at the source of switch $M_4$.

Error calculation circuit 103 can include transconductance amplifier $G_m$, controllable switch $S_3$, and capacitor $C_3$. A non-inverting input terminal of transconductance amplifier Gm can receive voltage reference signal $V_{REF}$, an inverting input terminal can be configured as the input terminal of error calculation circuit 102, and can connect to the source of switch $M_4$, and an output terminal can connect to a first input terminal of controllable switch $S_3$. A second terminal of controllable switch $S_3$ can connect to a first terminal of capacitor $C_3$, and a second terminal of capacitor $C_3$ can connect to ground.

Switch $S_3$ can be controlled by pulse signal $D_c$ with a duty cycle of no more than, e.g., 0.05. The error between voltage feedback signal $V_{FB}$ that represents current feedback signal $I_{FB}$ and reference voltage signal $V_{REF}$ may be calculated by transconductance amplifier $G_m$. When controllable switch $S_3$ is on, capacitor $C_3$ can be charged to generate voltage $V_c$ at a first terminal of capacitor $C_3$. When controllable switch $S_3$ is off, voltage $V_c$ across capacitor $C_3$ may be maintained as substantially constant, in order to generate a compensation signal representing the error between voltage feedback signal $V_{FB}$ and reference voltage signal $V_{REF}$.

When the duty cycle of pulse signal $D_c$ is 0.5, the capacitance of capacitor $C_3$ is 1, when the duty cycle is 0.05, the capacitance of capacitor $C_3$ can be 0.1. When there is no controllable switch $S_3$ employed, the capacitance of capacitor $C_3$ can be 2. In this particular example, the capacitance of capacitor $C_3$ can be no more than 0.1 if the duty cycle of pulse signal $D_c$ employed to control switch $S_3$ is no more than 0.05. The capacitance of capacitor $C_3$ can be decreased by adding controllable switch $S_3$ to decrease the volume of capacitor $C_3$ which can facilitate integration of capacitor $C_3$ into one chip, in order to decrease the pins and peripheral circuitry of the chip.

Inductor current zero crossing detection circuit 103 can include bias voltage supply $V_{OS}$ and comparator $A_3$. A positive terminal of bias voltage supply $V_{OS}$ can be configured as a first input terminal of inductor current zero crossing detection circuit 103, and can connect to DC voltage supply $V_{CC}$, and a negative terminal can connect to a non-inverting input terminal of comparator $A_3$. An inverting input terminal of comparator $A_3$ may be configured as a second input terminal of inductor current zero crossing detection circuit 103, and can connect to a third input terminal of output current calculation circuit 101, and an output terminal can be configured as an output terminal of inductor current zero crossing detection circuit 103, and can connect to a second input terminal of duty cycle calculation circuit 104.

Duty cycle calculation circuit 104 can include flip-flop $RS_1$, flip-flop $RS_2$, pulse signal generator 1041, comparator $A_4$, current the source $I_S$, capacitor $C_4$, controllable switch $S_4$, and inverter 1042. For example, set terminal S of flip-flop $RS_1$ can be configured as the second input terminal of duty cycle calculation circuit 104, and can connect to the output terminal of comparator $A_3$, reset terminal R can connect to an output terminal of comparator $A_4$, and output terminal Q can connect to an input terminal of inverter 1042, and may be configured as the first output terminal of duty cycle calculation circuit 104 coupled to the gate of switch $M_1$. A non-inverting input terminal of comparator $A_4$ can connect to a first terminal of capacitor $C_4$, and an inverting input terminal can be configured as the first input terminal of duty cycle calculation circuit 104, and can connect to a first terminal of capacitor $C_3$.

A negative terminal of current the source $I_S$ can connect to the first terminal of capacitor $C_4$, and a second terminal of capacitor $C_4$ can connect to ground. A first terminal of controllable switch $S_4$ can connect to the first terminal of capacitor $C_4$, and a second terminal can connect to the second terminal of capacitor $C_4$. Switch $S_4$ can be controlled by an output signal of inverter 1042. A first terminal of pulse signal generator 1041 can connect to set terminal S of flip-flop RS1, and a second terminal can connect to reset terminal R of flip-flop $RS_2$. Set terminal S of flip-flop $RS_2$ can connect to an input terminal of inverter 1042, and output terminal Q may be configured as the second output terminal of duty cycle calculation circuit 104, and can connect to the gate of switch $M_4$.

When the current flowing through inductor $L_b$ crosses zero, the output signal of comparator $A_3$ (a comparison signal) can go high. The PWM control signal generated at output terminal Q of flip-flop RS 1 may also be high because the high level compensation signal provided to set terminal S may turn on switch $M_1$, and power switch $Q_b$ can also be turned on. A high level PWM control signal can go low by inverter 1042, in order to turn off controllable switch $S_4$, and capacitor $C_4$ may be charged by current the source $I_S$. When the voltage across capacitor $C_4$ reaches a level of the voltage across capacitor $C_3$, a high level output of comparator A4 can be provided to reset terminal R of flip-flop $RS_1$. The PWM control signal can go low to turn off switch $M_1$, and then power switch $Q_b$ may also be turned off until switch $M_1$ is turned on again in a next switching period. The on time and switching period of power switch $Q_b$ can be maintained as substantially constant to achieve a high power factor and improved performance.

When the current flowing through inductor $L_b$ crosses zero, the PWM control signal may be high, flip-flop $RS_2$ can be set, and output signal $T_{DIS}$ at output terminal Q may go high to turn on switch $M_4$. The current flowing through inductor $L_b$ may continue to decrease to be negative. Therefore, a mirror current that mirrors the current of inductor $L_b$ can be cut off such that the current feedback signal is zero. When the output signal of comparator $A_3$ is high, an output signal generated by pulse signal generator 1041 can be provided to reset terminal R of flip-flop $RS_2$, and output signal $T_{DIS}$ can go low.

In this example, the on time and switching period of power switch $Q_b$ can be maintained as substantially constant to achieve a high power factor and improve performance. Furthermore, a controllable switch can be employed in the error calculation circuit, which can be controlled by a pulse signal with a duty cycle of no more than, e.g., 0.05 to decrease the capacitance of a compensation capacitor. Therefore, the compensation capacitor can be more easily integrated into one chip together with the APFC control circuit, in order to decrease the number of pins and peripheral circuitry.

Figure 4:
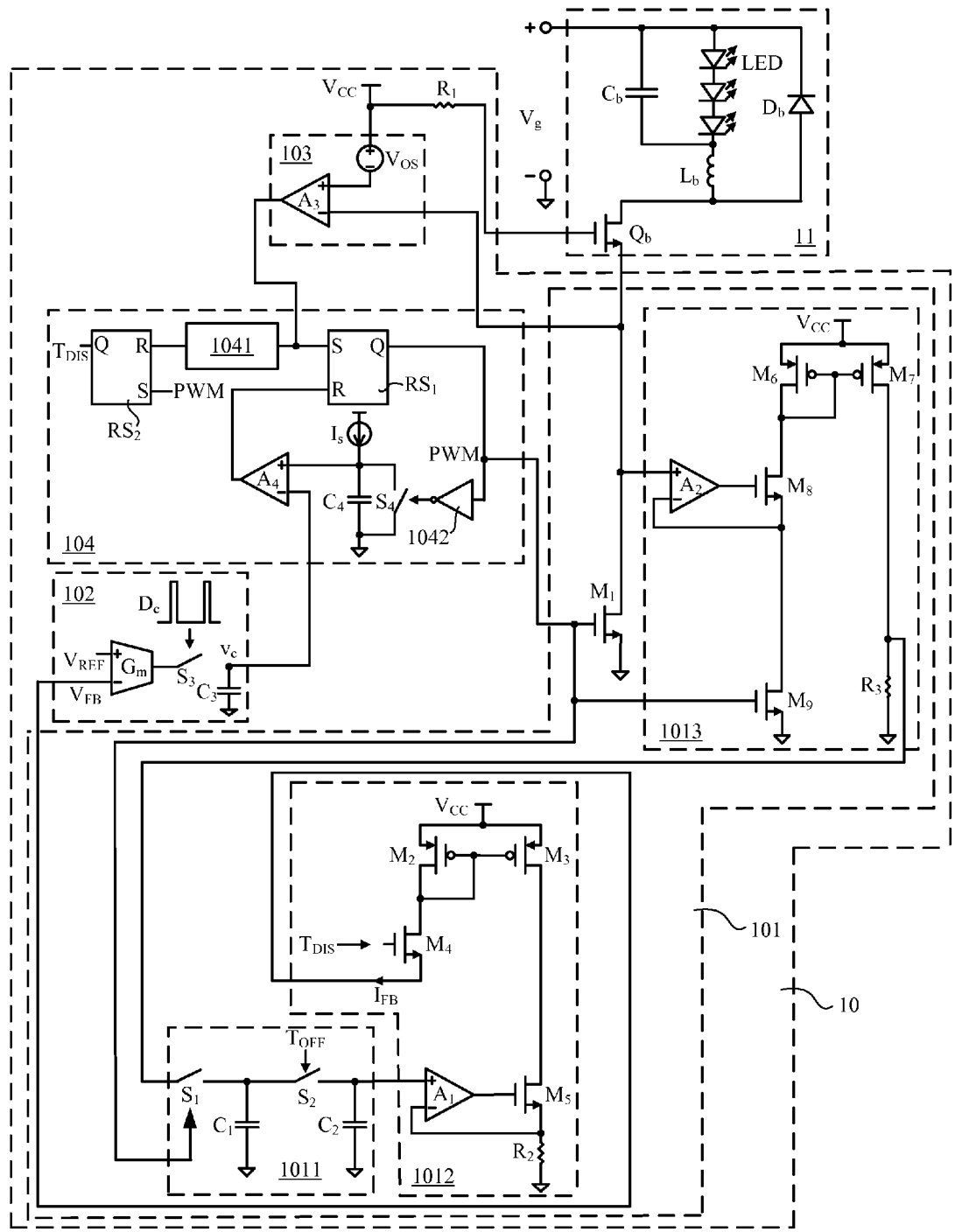
FIG. 4 is a schematic block diagram of a fourth example APFC control circuit, in accordance with embodiments of the present invention.

Referring now to FIG. 4, shown is a schematic block diagram of a fourth example APFC control circuit, in accordance with embodiments of the present invention. In this example, current mirror circuit 1013 can be coupled between the inductor current peak value detection circuit and switch $M_1$. A first input terminal of current mirror circuit 1013 can connect to the drain of switch $M_1$, a second input terminal can connect to the gate of switch $M_1$, and an output terminal can connect to the first input terminal of inductor current peak value detection circuit 1011. Current mirror circuit 1013 can mirror the current flowing through switch $M_1$ to generate a mirror current, which can also represent the current flowing through inductor $L_b$. The mirror current may be generated by enlarging the current flowing through inductor $L_b$, which can increase the accuracy of current detection to improve the control accuracy of the APFC control circuit.

Current mirror circuit 1013 can include switch $M_6$, switch $M_7$, switch $M_8$, switch $M_9$, amplifier $A_2$, and resistor $R_3$. For example, the gate of switch $M_6$ can connect to the gate of switch $M_7$ and the drain of switch $M_6$. The source of switch $M_6$ can connect to the source of switch $M_7$ and DC voltage supply $V_{CC}$. The drain of switch $M_6$ can connect to the drain of switch $M_8$. The drain of switch $M_7$ can connect to a first terminal of resistor $R_3$. Switches $M_6$ and $M_7$ can form a current mirror. The gate of switch $M_8$ can connect to an output terminal of amplifier $A_2$, and the source can connect to an inverting input terminal of second amplifier $A_2$ and the drain of switch $M_9$. The gate of switch $M_9$ may be configured as a second input terminal of current mirror circuit 1013, and can connect to the gate of switch $M_1$, and the source can connect to ground. A non-inverting input terminal of amplifier $A_2$ may be configured as a first input terminal of current mirror circuit 1013, and can connect to the drain of switch $M_1$. Switches $M_9$ and $M_1$ can form another current mirror. Also, a second terminal of resistor $R_3$ can connect to ground.

Assuming that the ratio between current of switches $M_9$ and $M_1$ is k, the current flowing through current mirror circuit 1013 can be k times the current flowing through inductor current $L_b$. Therefore, the accuracy of detection of the inductor current peak value can be improved. In this example, the ratio between the resistances of resistors $R_2$ and $R_3$ can be predetermined. Therefore, the multiple of the enlarging current by current mirror circuit 1013 can be determined by regulating the ratio between the resistances of resistors $R_2$ and $R_3$, in order to decrease the accuracy requirement of resistors $R_2$ and $R_3$.

Figure 5:
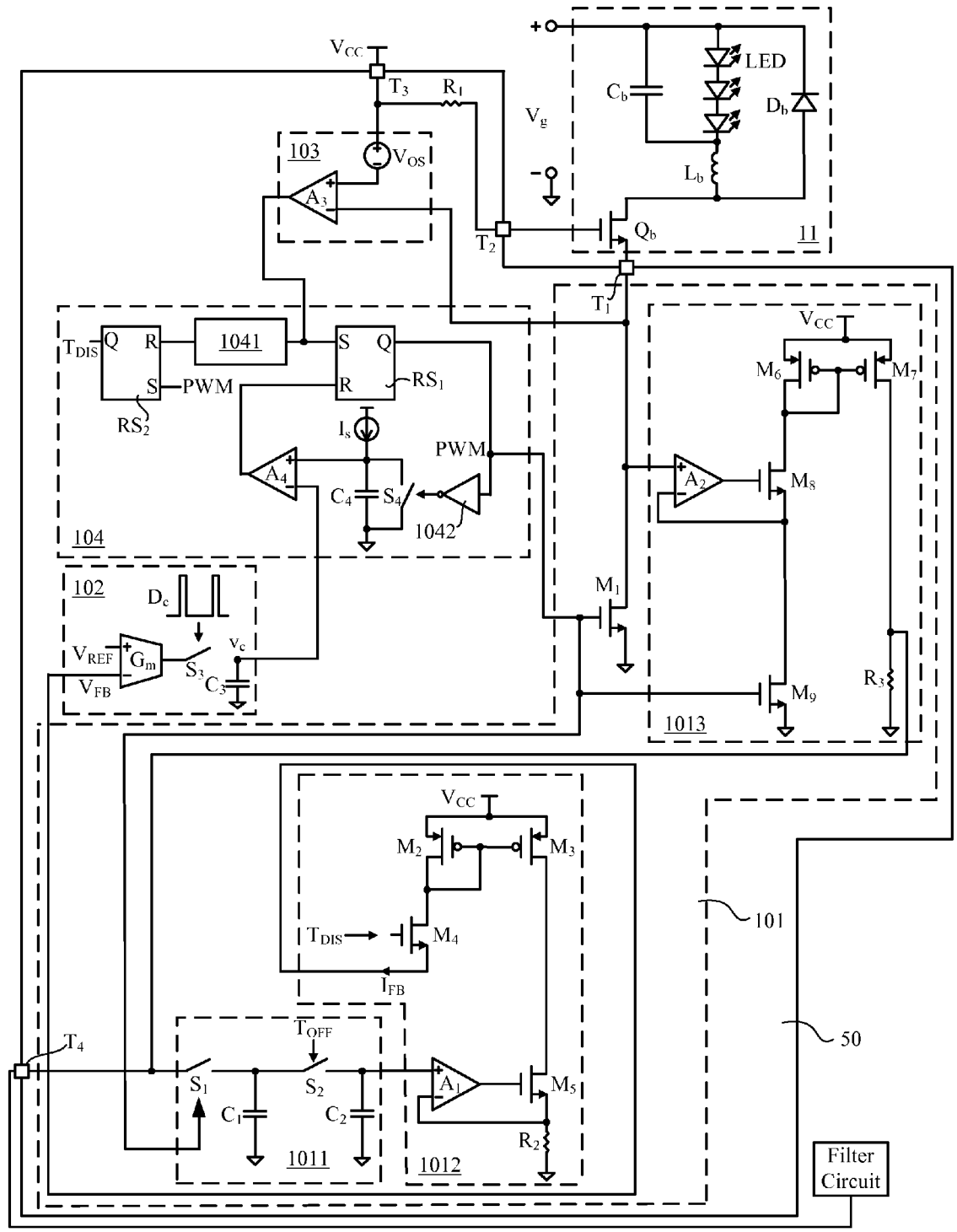
FIG. 5 is a schematic block diagram of a fifth example APFC control circuit, in accordance with embodiments of the present invention.

Referring now to FIG. 5, shown is a schematic block diagram of a fifth example APFC control circuit, in accordance with embodiments of the present invention. In this example, APFC control chip 50 can include an APFC control circuit as described above, as well as pin $T_1$, pin $T_2$, pin $T_3$, and pin $T_4$. The third input terminal of output current calculation circuit 101 can connect to the drain of power switch $Q_b$ of power converter 11 through pin $T_1$. The first input terminal of inductor current zero crossing detection circuit 103 can connect to the gate of power switch $Q_b$ through pin $T_2$ and can connect to DC voltage supply $V_{CC}$ by pin $T_3$. The input terminal of error calculation circuit 102 can connect to filter circuit 51 through pin $T_4$. APFC control chip 50 can integrate output current calculation circuit 101, error calculation circuit 102, inductor current zero crossing detection circuit 103, and duty cycle calculation circuit 104 into one chip/IC with only four pins for external connection, which can decrease the amount of peripheral circuitry.

Figure 6:
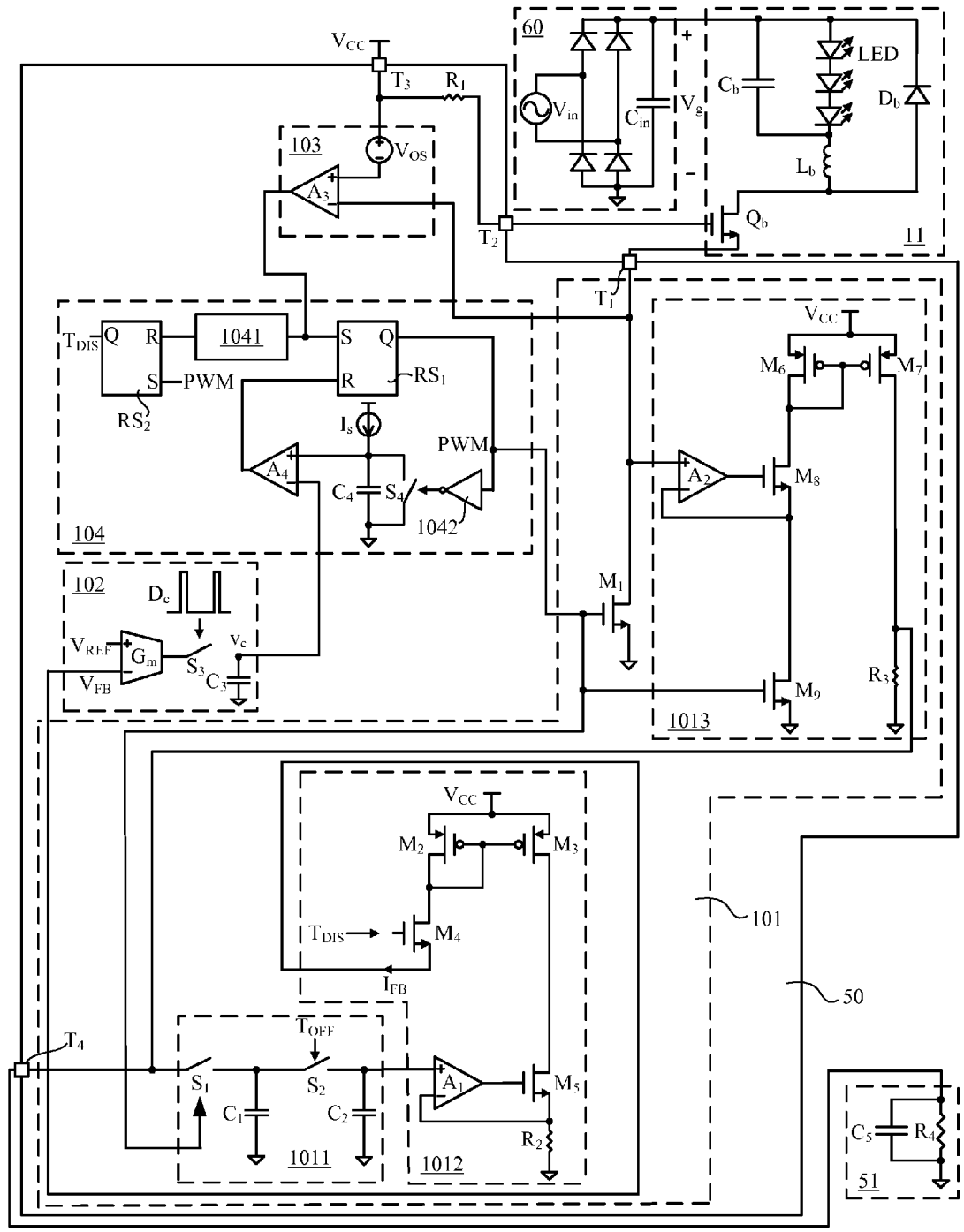
FIG. 6 is a schematic block diagram of a sixth example APFC control circuit, in accordance with embodiments of the present invention.

Referring now to FIG. 6, shown is a schematic block diagram of a sixth example APFC control circuit, in accordance with embodiments of the present invention. The LED driving circuit can include power converter 11, an APFC control circuit as described above, and filter circuit 51. Power converter 11 can convert input voltage $V_g$ into a DC voltage and a DC current, in order to drive an LED load under the control of the APFC control circuit. Filter circuit 51 can filter the current feedback signal generated by output current calculation circuit 101, in order to generate a voltage feedback signal that represents the current feedback signal.

In this example, AC input voltage may be rectified by a rectifier (e.g., a rectifier bridge), and filtered by capacitor $C_{in}$ to generate DC input voltage $V_g$. Input voltage $V_g$ can be converted to a constant output current to drive the LED load by power converter 11 under the control of the APFC control circuit. Current feedback signal $I_{FB}$ may be filtered by filter circuit 51 to generate a voltage feedback signal, and then be provided to error calculation circuit 102. In this example, power converter 11 can include inductor $L_b$, power switch $Q_b$, capacitor $C_b$, and diode $D_b$. One terminal of inductor $L_b$ can connect to cathode of the LED load, and the other terminal can connect to the drain of power switch $Q_b$.

Filter circuit 51 can include resistor $R_4$ and capacitor $C_5$ connected in parallel. A first terminal of resistor $R_4$ can connect to the input terminal of error calculation circuit 102 through pin $T_4$, and a second terminal can connect to ground. In this example, a high power factor and a constant driving current can be achieved relative to other approaches. The on and off states of power switch $Q_b$ can be controlled by regulating the voltage of the source of power switch $Q_b$ in view that voltage of the gate is substantially constant. In this example, output current calculation circuit 101, error calculation circuit 102, inductor current zero crossing detection circuit 103, and duty cycle calculation circuit 104 can be integrated into one chip, in order to significantly decrease the amount of peripheral circuitry, and to simplify application of the chip.

The embodiments were chosen and described in order to best explain the principles of the invention and its practical applications, to thereby enable others skilled in the art to best utilise the invention and various embodiments with modifications as are suited to the particular use contemplated. It is intended that the scope of the invention be defined by the claims appended hereto and their equivalents.

What is claimed is:

1. An active power factor correction (APFC) control circuit, configured to generate a pulse-width modulation (PWM) control signal to control the operation of a power converter, the APFC control circuit comprising:
   a) an inductor current zero crossing detection circuit coupled to a common node between a power switch of said power converter and a first switch that are coupled in series, wherein said inductor current zero crossing detection circuit is configured to generate a comparison signal based on a voltage signal at said common node;
   b) said comparison signal being activated when an inductor current of said power converter decreases to zero; and
   c) said APFC control circuit being configured as a source driver, wherein a control terminal of said power switch is coupled to a constant voltage supply.

2. The APFC control circuit of claim 1, further comprising a trigger signal generation circuit configured to generate a trigger signal that represents an on time of said inductor current in accordance with said comparison signal and said PWM control signal.

3. The APFC control circuit of claim 2, further comprising an inductor current peak value detection circuit coupled to said common node, wherein said inductor current peak value detection circuit is configured to detect a peak value of said inductor current.

4. The APFC control circuit of claim 3, further comprising an output current calculation circuit configured to generate a current feedback signal in accordance with said trigger signal and said peak value of said inductor current.

5. The APFC control circuit of claim 4, further comprising a PWM control signal generation circuit configured to generate said PWM control signal in accordance with said comparison signal and said current feedback signal.

6. The APFC control circuit of claim 5, wherein an on time of said power switch is regulated to be substantially constant.

7. The APFC control circuit of claim 5, wherein said comparison signal is configured to trigger said PWM control signal.

8. The APFC control circuit of claim 5, further comprising a filter circuit configured to generate a voltage feedback signal by filtering said current feedback signal.

9. The APFC control circuit of claim 8, wherein said PWM control signal generation circuit comprises:
   a) an error calculation circuit configured to calculate an error between said voltage feedback signal and a voltage reference, and to generate a compensation signal;
   b) an on time generation circuit configured to generate an on time signal in accordance with said compensation signal; and
   c) a logic circuit configured to generate said PWM control signal in accordance with said on time signal and said comparison signal.

10. The APFC control circuit of claim 8, wherein:
   a) said inductor current zero crossing detection circuit, said trigger signal generation circuit, said inductor current peak value detection circuit, said output current calculation circuit, and said PWM control signal generation circuit are integrated into a chip; and
   b) said first filter circuit is coupled to one pin of said chip.

11. The APFC control circuit of claim 10, wherein said power switch and said first switch are integrated into said chip, said chip comprising:
   a) a first pin coupled between said voltage supply and said control terminal of said power switch;
   b) a second pin coupled between a power terminal of said power switch and said inductor;
   c) a third pin coupled between said output current calculation circuit and said filter circuit; and
   d) a fourth pin coupled to ground.

12. The APFC control circuit of claim 10, wherein said first switch is integrated into said chip, said chip comprising:
   a) a first pin coupled between said voltage supply and said inductor current zero crossing detection circuit;
   b) a second pin coupled between a control terminal of said power switch and said voltage supply;
   c) a third pin coupled between a second power terminal of said power switch and a first terminal of said first switch; and
   d) a fourth pin coupled between said output current calculation circuit and said filter circuit.

13. A light-emitting diode (LED) driving circuit, comprising:
   a) the APFC control circuit of claim 8; and
   b) a power conversion circuit configured to receive a DC input voltage, and being controlled by said PWM control signal to generate an output current to drive an LED load.

14. The LED driving circuit of claim 13, wherein said power conversion circuit is configured as a buck power stage circuit comprising:
   a) said LED load, said inductor, said power switch, and said first switch coupled in series between said DC input voltage and ground;
   b) an output capacitor coupled in parallel with said LED load; and
   c) a rectifier device coupled between said DC input voltage and a common node of said inductor and said power switch.

15. The APFC control circuit of claim 4, wherein said inductor current peak value detection circuit comprises:
   a) a first controllable switch coupled to said common node and controlled by said PWM control signal;
   b) a filter circuit coupled to said controllable switch; and
   c) said controllable switch being turned on, and said inductor current being filtered by said filter circuit to generate a first voltage signal that said peak value of said inductor current when said PWM control signal is active.

16. The APFC control circuit of claim 15, wherein said output current calculation circuit comprises:
   a) a current-to-voltage conversion circuit configured to convert said first voltage signal to a current signal; and
   b) a controllable switch coupled to said current-to-voltage conversion circuit and controlled by said trigger signal, wherein a current flowing through said controllable switch is configured as said current feedback signal.

17. The APFC control circuit of claim 4, wherein:
   a) said current feedback signal is configured as a square waveform;
   b) in each switching cycle, a peak value of said current feedback signal is in direct proportion with said peak value of said inductor current; and
   c) an on time of said current feedback signal is consistent with that of said comparison signal.

18. The APFC control circuit of claim 2, wherein said trigger signal generation circuit comprises an RS flip-flop having a set terminal configured to receive said PWM control signal, and a reset terminal configured to receive said comparison signal.

19. The APFC control circuit of claim 1, wherein said comparison signal is activated when said voltage signal at said common node begins to decrease.

* * * * *